United States Patent
Simon

(10) Patent No.: US 7,377,650 B2
(45) Date of Patent: May 27, 2008

(54) PROJECTION OF SYNTHETIC INFORMATION

(75) Inventor: Markus Simon, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 10/544,405

(22) PCT Filed: Nov. 21, 2003

(86) PCT No.: PCT/EP03/13092

§ 371 (c)(1),
(2), (4) Date: Aug. 3, 2005

(87) PCT Pub. No.: WO2004/070485

PCT Pub. Date: Aug. 19, 2004

(65) Prior Publication Data

US 2006/0152478 A1    Jul. 13, 2006

(30) Foreign Application Priority Data

Feb. 3, 2003    (EP) .................................. 03002329

(51) Int. Cl.
G03B 21/14    (2006.01)
(52) U.S. Cl. .......................... 353/28; 353/121; 345/419
(58) Field of Classification Search ................ 353/121, 353/122, 28, 30, 31, 29; 345/168, 156, 158, 345/169, 173, 419, 418, 653; 455/566, 550
See application file for complete search history.

(56) References Cited

U.S. PATENT DOCUMENTS

| | | | |
|---|---|---|---|
| 5,694,142 A * | 12/1997 | Dumoulin et al. ............. 345/9 |
| 6,084,557 A | 7/2000 | Ishida et al. | |
| 6,614,422 B1 * | 9/2003 | Rafii et al. ................... 345/168 |
| 7,292,269 B2 * | 11/2007 | Raskar et al. .......... 348/207.99 |
| 2002/0061217 A1 | 5/2002 | Hillman et al. | |
| 2003/0092470 A1 * | 5/2003 | Kurakane .................... 455/566 |
| 2005/0017967 A1 * | 1/2005 | Ratti et al. ................... 345/418 |
| 2005/0243085 A1 * | 11/2005 | Schechter .................... 345/419 |
| 2006/0038814 A1 * | 2/2006 | Rivera ......................... 345/419 |

FOREIGN PATENT DOCUMENTS

| | | |
|---|---|---|
| DE | 100 22 577 | 11/2001 |
| DE | 100 41 109 | 3/2002 |
| EP | 1 248 227 | 10/2002 |
| FR | 2 729 236 | 7/1996 |
| WO | WO 00/21024 | 4/2000 |

(Continued)

OTHER PUBLICATIONS

XP002248709—Raczynski et al., "Augmented reality @ Siemens: The Workflow Designer Project & Augmented reality PDA" First IEEE International Augmented Reality Toolkit Workshop, Sep. 29, 2002.

(Continued)

Primary Examiner—William C. Dowling
(74) Attorney, Agent, or Firm—Bell, Boyd & Lloyd LLP

(57) ABSTRACT

A real environment during which a feedback between the position of the information and the projection thereof ensues with means for image processing and/or pattern recognition. The feedback ensues in such a manner that the information is positioned at a predetermined position in the real environment.

4 Claims, 1 Drawing Sheet

FOREIGN PATENT DOCUMENTS

WO        WO 01/54110        7/2001

OTHER PUBLICATIONS

XP010568065—Geiger et al., "Mobile AR4ALL" Augmented Realty 2001, Proceedings, IEEE and ASCM International Symposium on New York, Oct. 29, 2001, pp. 181-182.

"A Wearable Mixed Reality System with an On-board Projector", written by Toshikazu Karikusa and two others, from the collection of essays of 7th Convention of the Virtual Reality Society of Japan, published on Sep. 18, 2002 by the Virtual Reality Society of Japan, pp. 329 and 330; others: 2002; JP.

"A Wearable Mixed Reality System for Outdoor Use: System and Applications", written by Mahoro Anabuki and three others, from the collection of essays of 6th Convention of the Virtual Reality Society of Japan, published on Sep. 19, 2001 by the Virtual Reality Society of Japan, pp. 277-280; others: 2001; JP.

"Registration of Physical and Virtual Spaces in Mixed Reality Systems", written by Kiyohide Sato and two others, from the collection of essays of 2nd Convention of the Virtual Reality Society of Japan, published on Sep. 18, 1997 by the Virtual Reality Society of Japan, pp. 161-164: others: 1997; JP.

\* cited by examiner

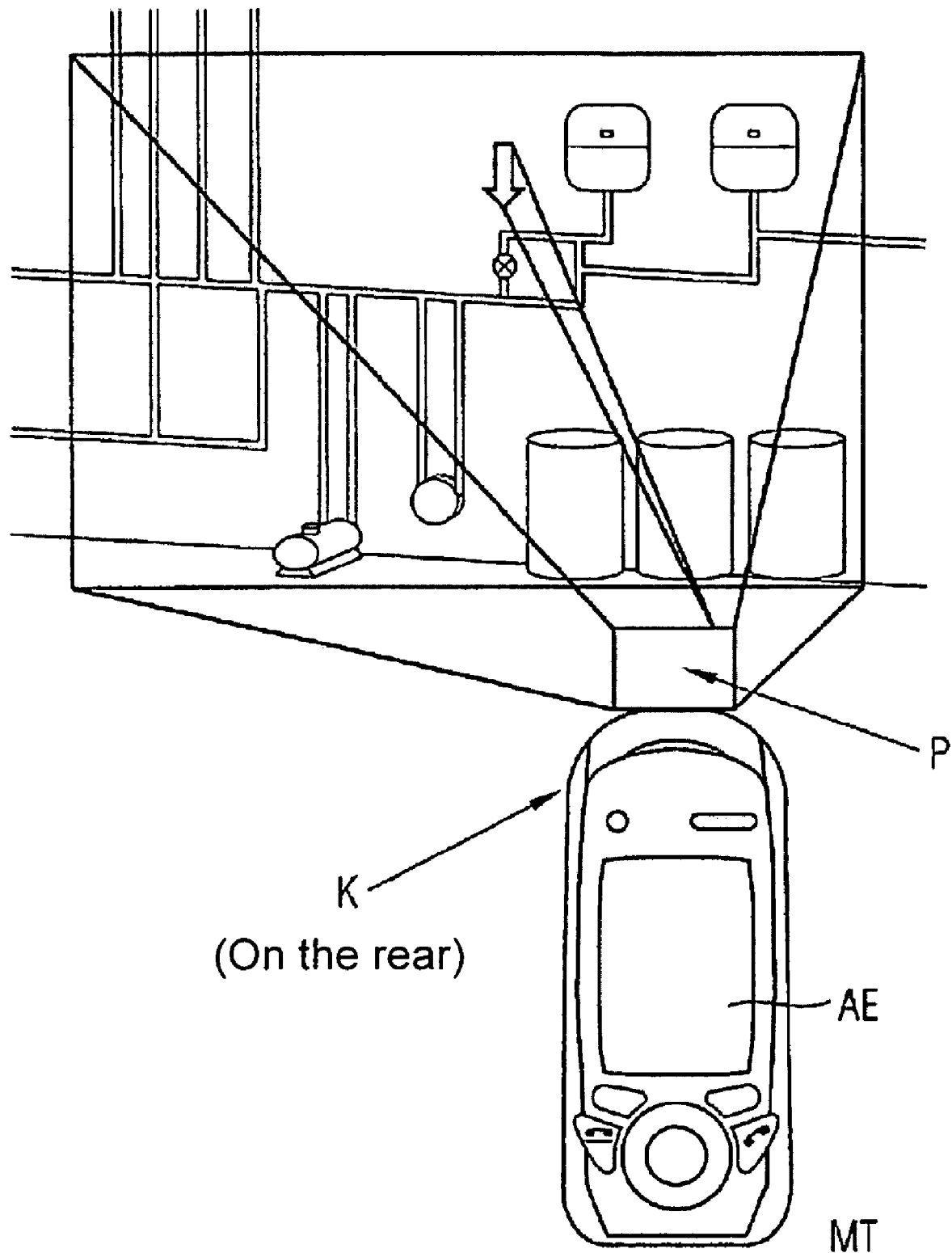

PROJECTION OF SYNTHETIC INFORMATION

FIELD OF TECHNOLOGY

The present disclosure relates to a method for projecting synthetic information into a real environment, and also to a mobile terminal device embodied for this purpose.

BACKGROUND

The projection of synthetic information or, as the case may be, supplementary information leads to an enhancement of the real world. This process is generally referred to as "augmented reality". By means of such methods useful information that is necessary for completing a particular task can be communicated to the user.

Thus, in the course of a maintenance task, for example, the fitter can receive support by reference to the camera image of a maintenance facility, with the next instruction step being artificially superimposed at the corresponding position of the equipment in the camera image. This is made possible by the projection of the synthetic information into the three-dimensional model of the maintenance facility based on precise knowledge of the camera position.

Methods of this type are also employed in the medical domain in support of the examination of x-ray and ultrasound images, during an operation for example.

A projected user interface is described in WO-A-0154110. For the purpose of user input a finger on the interface, for example, is detected by means of a camera and analyzed in terms of its position relative to interface surfaces. In order to detect the position the interface has markings for the camera image, as a result of which the interface surfaces can be detected in their location in the camera image.

In all known applications relating to the topic of "augmented reality" the resulting image, which is typically a modified camera image, is visualized on a display. The user himself/herself is therefore constantly required to identify the indicated position within the modified image in the real surroundings or environment. If, in a very complex installation, an arrow, for example, is drawn in at a particular point in the camera image of the installation, it may be very difficult in certain circumstances to locate the relevant corresponding position in the real installation.

SUMMARY

The present disclosure avoids at least some of those disadvantages and further illustrates a method where synthetic information is projected directly into the real environment so that it is visualized at the corresponding image position.

According to an exemplary embodiment, synthetic information or supplementary information is projected into the real environment through the use of a camera in association with a projection unit. A correction of the projection position is effected through the implementation of a feedback between the camera image and the projection unit.

Furthermore, a feedback between camera image and projection unit is implemented in order to compensate for mapping errors.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 illustrates a mobile telephone MT used to project synthetic information into the real environment according to an exemplary embodiment.

DETAILED DESCRIPTION

Mobile telephone MT shown in FIG. 1 has, on its rear side, a camera module K for recording images from the environment, a processor for processing the image information (not shown), and a projection unit P, which is arranged for example rotatably on the top of the mobile telephone. Disposed on the front of the mobile telephone is a display device AE.

The camera image of FIG. 1 is analyzed using digital image processing. Generally this includes pattern recognition methods so that imaged objects can be recognized and identified, thereby enabling them to be assigned to a model. Thus, for example, information from the three-dimensional model of an installation is used as a basis for calculating the position at which, for example, an arrow shown in FIG. 1 is projected into the real environment by means of the projection unit P.

The result of the projection is subsequently analyzed in the camera image and the position of the arrow corrected if necessary by means of a feedback. As already explained, the image itself can also be corrected, in terms of its size for example.

The method uses a projection unit P and a camera or, as the case may be, a camera module K. Through analysis of the camera image and using a 3D object model as a basis, the coordinate at which the synthetic information is projected into the real environment by the projector P is calculated. The user therefore sees the additional synthetic information directly at the object. The information then determines the further activity of the user.

Thus, in the example of the maintenance task an arrow can be projected directly onto the part that is to be replaced, for example. In this case the user does not need to look at a display or, as the case may be, the display device AE, and also does not have to recognize the designated part in the real environment. As a result dealing with augmented reality is made much easier and also more reliable.

In addition, the camera image is constantly used to monitor the result of the projection using digital image processing methods. The projection position and, in a development, also mapping errors due to the three-dimensional nature of the object can be captured and corrected. Mapping errors result, for example, when an arrow is mapped on an inclined plane. A possible distortion is eliminated by means of the correction.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for projecting synthetic information into a real environment, comprising:
    generating a camera image of the real environment;
    assigning the camera image to a model using means for image processing or pattern recognition;

calculating a position of the information using the model as a basis;

projecting the information into the environment; and establishing a feedback via the camera image between the position of the information in the model and the projected position thereof in the camera image such that the information is positioned in the real environment at a position determined by the model.

2. The method as claimed in claim 1, wherein a feedback between the visualization of the information and the projection thereof is established using the means for image processing such that mapping errors in the projection are corrected.

3. A mobile terminal device, comprising:

a camera; a projection unit for projecting synthetic information into a real environment; and means for image processing or pattern recognition; wherein a camera image of the real environment is generated and assigned to a model using said means; wherein a position of the information is calculated using the model as a basis and the information is projected into the environment, and wherein a feedback via the camera image between the position of the information in the model and the projected position thereof in the camera image is established such that the information is positioned in the real environment at a position predetermined by the model.

4. The terminal device as claimed in claim 3, wherein a feedback between the visualization of the information and the projection thereof is established using the means for image processing such that mapping errors in the projection can be corrected.

* * * * *